(12) United States Patent
Dietz et al.

(10) Patent No.: US 8,234,934 B2
(45) Date of Patent: Aug. 7, 2012

(54) ULTRASOUND MEASUREMENT OF THE FLOW SPEED OF A FLUID IN A CONDUIT

(75) Inventors: Toralf Dietz, Dresden (DE); John Lansing, Houston, TX (US)

(73) Assignee: Sick Engineering GmbH, Ottendorf-Okrilla (DE)

(*) Notice: Subject to any disclaimer, the term of this patent is extended or adjusted under 35 U.S.C. 154(b) by 71 days.

(21) Appl. No.: 12/891,090

(22) Filed: Sep. 27, 2010

(65) Prior Publication Data
US 2011/0277558 A1 Nov. 17, 2011

(30) Foreign Application Priority Data
May 12, 2010 (EP) ..................... 10162691

(51) Int. Cl.
*G01F 1/66* (2006.01)
(52) U.S. Cl. .................... 73/861.31
(58) Field of Classification Search ........... 73/861.31, 73/861.27, 861.29; 702/48
See application file for complete search history.

(56) References Cited

U.S. PATENT DOCUMENTS

| | | | | |
|---|---|---|---|---|
| 3,940,985 | A * | 3/1976 | Wyler | 73/861.31 |
| 4,300,401 | A * | 11/1981 | Pedersen | 73/861.31 |
| 7,706,986 | B2 * | 4/2010 | Frohlich et al. | 702/48 |
| 7,752,919 | B2 * | 7/2010 | Straub et al. | 73/861.29 |

FOREIGN PATENT DOCUMENTS

| | | |
|---|---|---|
| DE | 10 2005 047 790 A1 | 4/2007 |
| DE | 10 2008 029 772 A1 | 12/2009 |
| EP | 1 378 727 A1 | 1/2004 |
| EP | 1 936 333 A1 | 6/2008 |
| EP | 2 072 972 A1 | 6/2009 |

OTHER PUBLICATIONS

European Search Report, Application No. EP 10 16 2691, mailed on Oct. 26, 2010, six (6) pages.

* cited by examiner

*Primary Examiner* — Jewel V Thompson
(74) *Attorney, Agent, or Firm* — The Nath Law Group; Jerald L. Meyer; Stanley N. Protigal

(57) ABSTRACT

An ultrasound measurement apparatus (10) is set forth for measuring the flow speed of a fluid in a conduit (12) having a plurality of ultrasonic transducers (14) pairs of which span between them a plurality of main measurement paths and at least one diagnosis measurement path, and having an evaluation unit (12) which is made to determine a respective individual measured value for the flow speed from transit times of ultrasound transmitted and received with and against the flow on each measurement path (16, 18), to calculate individual measured values of the main measurement paths as a main measured value for the flow speed, to determine a measured diagnosis value from the at least one individual measured value of the diagnosis measured path and to compare the main measured value and the measured diagnosis value with one another. In this respect at least some of the ultrasonic transducers (14a) have widened transmission and reception lobes so that a plurality of ultrasonic transducers (14, 14a) are arranged in their transmission and reception lobes so that, in addition to the primary measurement paths (16) spanned between two mutually aligned ultrasonic transducers, at least one additional secondary measurement path (18) is opened as a main measurement path or as a diagnosis measurement path.

15 Claims, 3 Drawing Sheets

ULTRASOUND MEASUREMENT OF THE FLOW SPEED OF A FLUID IN A CONDUIT

The invention relates to an ultrasound apparatus and to a method for measuring the flow speed of a fluid in a conduit in accordance with the preamble of claim 1 and claim 13 respectively.

Flow speeds in conduit and conduits can be determined by means of ultrasound measurement technology using the transit time difference method. An important and demanding area of application is represented by gas meters for natural gas pipeline where, due to the huge gas volumes conveyed and to the value of the resource, even the smallest deviations in the measurement precision correspond to very noticeable economic values.

Figure 8:
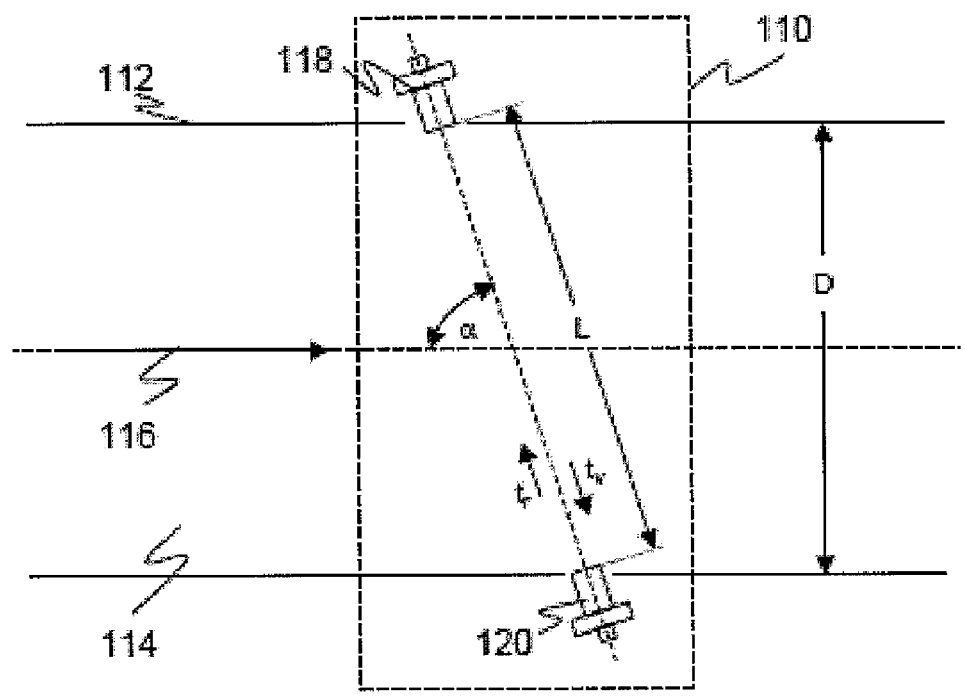

A known measurement principle is shown in FIG. 8. As essential components of a conventional measurement apparatus 110, two ultrasonic transducers 118, 120 are arranged at an angle in the wall of a conduit 112 in which a fluid 114 flows in the direction of the arrow 116. Ultrasonic pulses are transmitted and received transversely to the flow of the fluid on the measurement path between the ultrasonic transducers 118, 120, with the ultrasonic transducers 118, 120 operating alternately as transmitter and receiver. The ultrasonic signals transported through the fluid are accelerated in the flow direction and decelerated against the flow direction. The resulting transit time difference is calculated using geometrical parameters as a mean flow speed of the fluid. Together with the cross-sectional area, the operating volume flow results from this which is the measurement variable of interest with a fluid billed by volume, for example. The geometrical relationships are described by the following variables:

v: flow speed of the fluid in the line
L: length of the measurement path between the two ultrasonic transducers
α: angle at which the ultrasonic transducers transmit and receive
Q: volume flow
D: diameter of the line
$t_v$: transit time of the ultrasound with the flow
$t_r$: transit time of the ultrasound against the flow The following relationships result from this for the sought variables v and Q:

$$v = L/(2 \cos \alpha)(1/t_v - 1/t_r) \text{ and}$$

$$Q = v \cdot \tfrac{1}{4} D^2 \pi$$

The local, mean flow speed at the position of the measurement path is accordingly determined in this manner. However, this only produces a precise measured value with uniform flows. A plurality of measurement paths are therefore geometrically distributed over the cross-section of the conduit for demanding applications. A more precise value for the mean flow speed is then determined over the total cross-sectional area by a weighted addition of the measured values of the individual measurement paths. A series of measurement path configurations or layouts are presented in the standard ISO 17089-1.

The transition to a mean area speed from the individual sampling points which are formed by the measurement paths is also associated with an approximation error with a plurality of measurement paths. This error is not always minimal, but rather, for example, only when the measured flow profile corresponds to that flow profile chosen for an approximation polynomial. An increase in the number of measurement paths is, however, only possible with limitations for geometrical reasons and is moreover associated with a substantial increase in manufacturing costs.

An apparatus for the measurement of the movement of a fluid in a pipe is known from EP 2 072 972 A 1 which has a total of 32 ultrasonic transducers aligned pairwise with respect to one another, with additional measurement paths also being spanned to the ultrasonic transducers which are adjacent to the associated ultrasonic transducers. This huge number of ultrasonic transducers and measurement paths results in a very expensive system and a complicated evaluation. In this respect, ultrasonic transducers are also provided at the base and, however regularly become dirty in practice. The system is therefore not suitable for robust, cost-aware industrial use, particularly since it has no diagnosis functions at all.

To ensure a correct measurement, the measured values are checked so that flow profile changers are inter alia recognized. Possible causes for this can be found in a changed wall roughness due to contamination and corrosion, in partially blocked flow conditioners or flow rectifiers or in incompletely open valves or slides.

A diagnosis possibility of the measurement correctness comprises comparing the measured value with a second, independently determined measured value. A further ultrasound measurement system can be used for this purpose. To avoid a similar reaction to a disturbing influence in this comparison counter, the path layout of the comparison counter differs from that of the actual ultrasound measurement device. A known realization of this principle is the combination of a multipath system with a single-path system as presented in the article of Michael Brown "Custody Transfer Implementation of Multi-path Ultrasonic Meters", A.G.A. Operating Section Operations Conference in Seattle, Wash., May 18-21, 1998 The comparison counter, however, substantially increases the manufacturing and assembly effort and/or cost.

DE 10 2007 004 936 A1 discloses an ultrasound through-flow measurement device having a plurality of V-shaped measurement paths realized by a respective reflector as well as one or several additional ultrasonic transducers which span a further V-shaped measurement path in the perpendicular direction to recognize collections of dirt at the base of the measurement pipe. For this purpose, the additional ultrasonic transducers together with the associated electronics are required.

It is therefore the object of the invention to improve the measurement accuracy and reliability of an ultrasound measurement apparatus.

This object is satisfied by an ultrasound measurement apparatus in accordance with claim 1 and by a method for measuring the flow speed of a fluid in a conduit by means of ultrasound in accordance with claim 13. In this respect, the invention starts from the basic idea of implementing a diagnosis function as a comparison of a second independent measured diagnosis value with the actual main measured value. For this purpose, at least one of the measured values present is not used for the determination of the main measurement path, but of the measured diagnosis value. So that further ultrasonic transducers do not have to be attached especially for the diagnosis measurement path, the sound cones of at least some of the ultrasonic transducers present are widened so much that at least one additional measurement path is formed.

There are accordingly, from a geometrical point of view, primary measurement paths which are each spanned between a pair of mutually aligned ultrasonic transducers whose radiation axes are therefore aligned to one another. This alignment can take place both directly and indirectly via a reflector. In addition, due to the widened sound cones, secondary measurement paths arise to ultrasonic transducers which are arranged adjacent to the ultrasonic transducer associated on the basis of the alignment. As a rule, in this respect, secondary measurement paths to the next neighbors of the associated ultrasonic transducer are used because the angle is the most favorable here, but this is not compulsory. Such an ultrasonic transducer with widened sound cone is accordingly involved in a plurality of measurement paths. Either the function as the main measurement path for determining the main measured value or as the diagnosis measurement path can now be allocated to the primary and secondary measurement paths in initially any desired manner from a functional view point.

The invention has the advantage that the reliability of the main measured value is always checkable by the diagnosis function. The measured value quality and the trustworthiness of the measured value is increased with an unchanging ultrasound sensor system effort due to a continuous comparison of different measured results which are based on a respective different path layout. Impairments of the measurement accuracy are quickly recognized and result in a service request, for example. No additional ultrasonic transducers have to be used for this diagnosis function, but rather the additional secondary measurement paths are either used as diagnosis paths or replace the primary measurement paths for the determination of the main measured value if a primary measurement path should instead be used as a diagnosis measurement path. The additional effort due to the comparison measurement integrated into the main counter is therefore minimal.

At least one diagnosis measurement path is preferably a secondary measurement path. Nothing is then changed in the actual measurement of the main measured value; all primary measurement paths are still available as main measurement paths. The required adaptations on integration of the diagnosis function are thus particularly small.

The at least one diagnosis measurement path is preferably arranged diametrically. The sensitivity to possible flow profile changes is thus at a maximum so that the monitoring function is ideally supported.

The main measurement paths advantageously correspond to the primary measurement paths. The path layout and thus the evaluation in the determining of the main measured value then does not differ from that of an ultrasound measurement apparatus without a diagnosis function. Even more preferably, the at least one diagnosis measurement path also corresponds to the at least one secondary measurement path. In this case, the geometrical division into primary and secondary measurement paths and the functional division into main measurement paths and diagnosis measurement paths is then identical.

The primary measurement paths are preferably aligned parallel to one another. The flow profile can thus be particularly easily approximated without redundancies and accordingly with as few ultrasonic transducers as possible.

Two or four primary measurement paths are preferably provided. Four or eight ultrasonic transducers respectively are sufficient for this. Preferably one or two secondary measurement paths are accordingly provided to avoid unfavorable angles for these secondary measurement paths. Expressed from a functional point of view, two or four main measurement paths and/or one or two diagnosis measurement paths are preferably provided, with the association with the primarily and secondary measurement paths generally being selectable. In a particular embodiment, particularly the two or four primary measurement paths are the main measurement paths and the one secondary measurement path or the two secondary measurement paths are the diagnosis measurement path or diagnosis measurement paths.

Those ultrasonic transducers whose associated primary measurement paths have the smallest distance from the axis of the conduit preferably have widened transmission and reception lobes. They are thus those ultrasonic transducers which open the at least one secondary measurement path. In this arrangement, the secondary measurement paths are as close as possible to the pipe axis, that is at the center of the flow, and are thereby good, representative sampling points of the flow profile. This in particular applies when the ultrasonic transducers which span the primary measurement paths with the smallest distance from the axis of the conduit are symmetrical to this axis. The secondary measurement paths are then namely automatically diametrical.

The ultrasonic transducers are particularly preferably attached in a symmetrical arrangement. This produces a simple design and the best starting position for the approximation of the flow without prior knowledge of its irregularities.

The evaluation unit is preferably made to change the association of the main measurement paths and of the at least one diagnosis measurement path with primarily measurement paths and secondary measurement paths during operation. This can take place only randomly, for example once an hour, or on demand, but also at short time intervals up to a change at every measurement cycle. The change can furthermore take place during the operation or in a configuration. The sampling point selection is quasi mixed in the approximation of the flow by the change in the association so that any artifacts in the selection of which path is a main measurement path and which a diagnosis measurement path are eliminated. In addition, it is, for example, conceivable, to use all the available measurement paths for determining the main measurement path in large parts of operation and only to form a measured diagnosis value occasionally for its plausibilization.

The evaluation unit is preferably made to simultaneously pick up a received signal at all the ultrasonic transducers associated with the ultrasonic transducer by a primary measurement path or a secondary measurement path on the transmission of a signal from an ultrasonic transducer which is involved in a secondary measurement path and to calculate a corresponding plurality of signal transit times. All measurement paths in which a transmitting ultrasonic transducer is involved are thus evaluated together in a time effective manner. Alternatively, a multiplexing is also conceivable in which the receiving ultrasonic transducers associated with the transmitting ultrasonic transducer by means of a primary or secondary measurement path are evaluated after one another. The evaluation cycle is then extended; simpler evaluation electronics are sufficient for this.

The evaluation unit is preferably made, in a measurement cycle, a) to transmit a respective signal from each ultrasonic transducer after one another, b) to calculate a signal transit time on all measurement paths of the respective ultrasonic transducer, c) to associate all the signal transit times of the measurement cycle, once they have been determined, with one another pairwise in each case with reference to the measurement paths and d) to determine the individual measured values from them In this procedure, all the measurement paths are evaluated without mutual interference.

The fluid is preferably natural gas which again preferably flows in a pipeline. The ultrasound apparatus is therefore then used in large plant, for example for transnational natural gas deliveries.

The method in accordance with the invention can be further developed in a similar manner and shows similar advantages. Such advantageous features are described in an exemplary, but not exclusive manner in the subordinate claims dependent on the independent claims.

Figure 1:
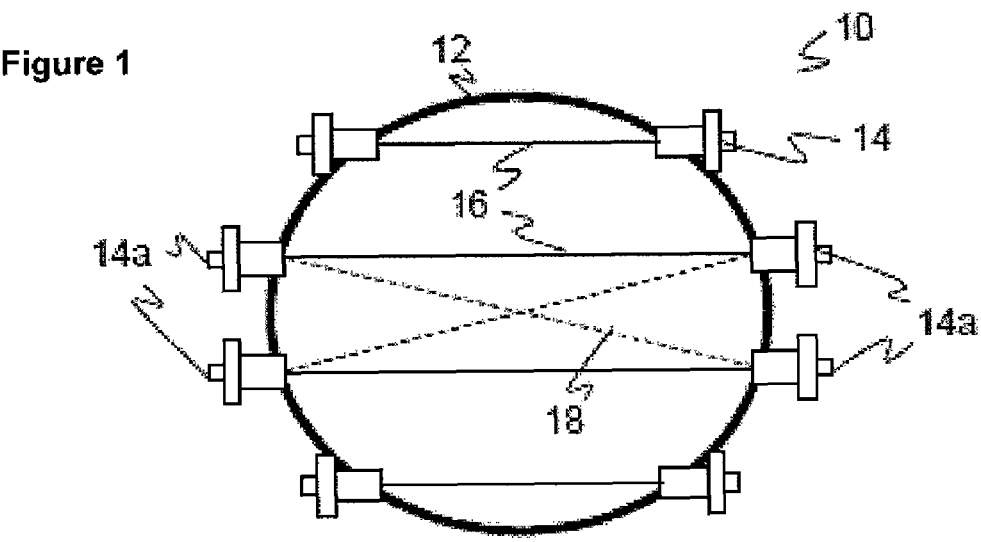

The invention will be explained in more detail in the following also with respect to further features and advantages by way of example with reference to embodiments and to the enclosed drawing. The Figures of the drawing show in:

FIG. 1 an oblique section through a conduit with the ultrasonic transducers of a first embodiment of an ultrasound measurement apparatus in accordance with the invention and its measurement paths.

Figure 2:
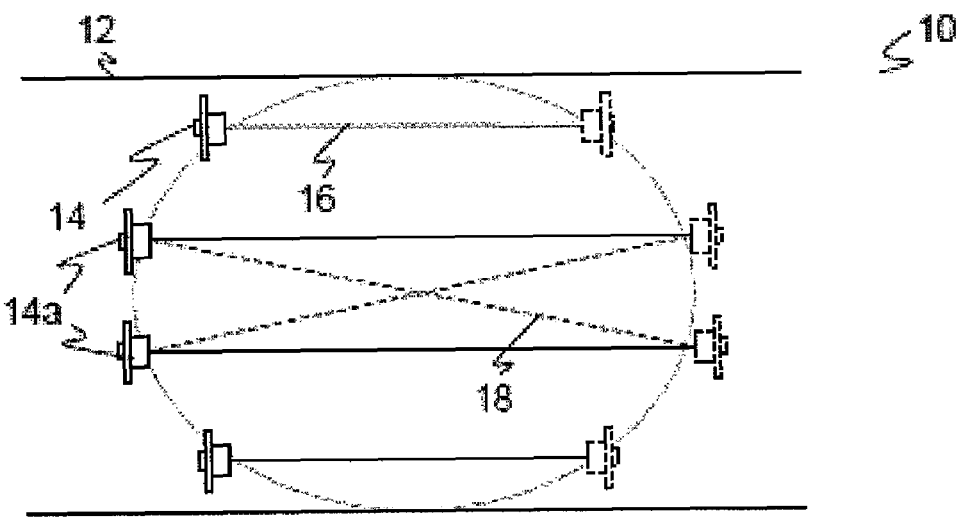
Figure 3:
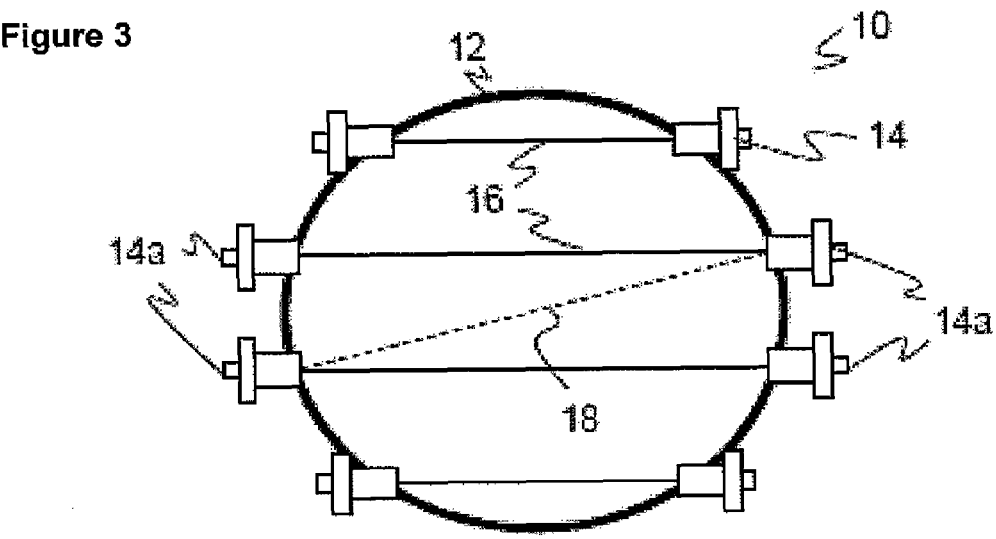
Figure 4:
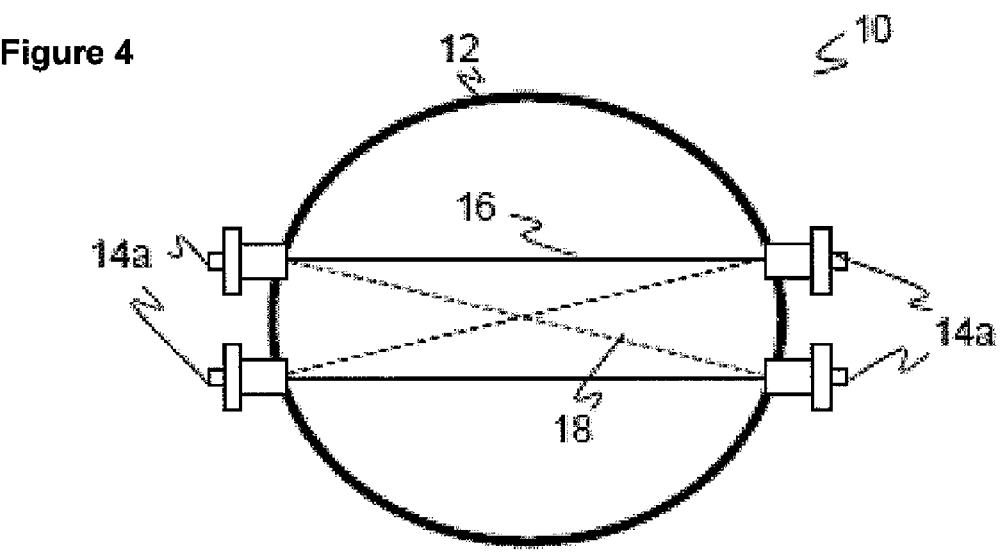
Figure 5:
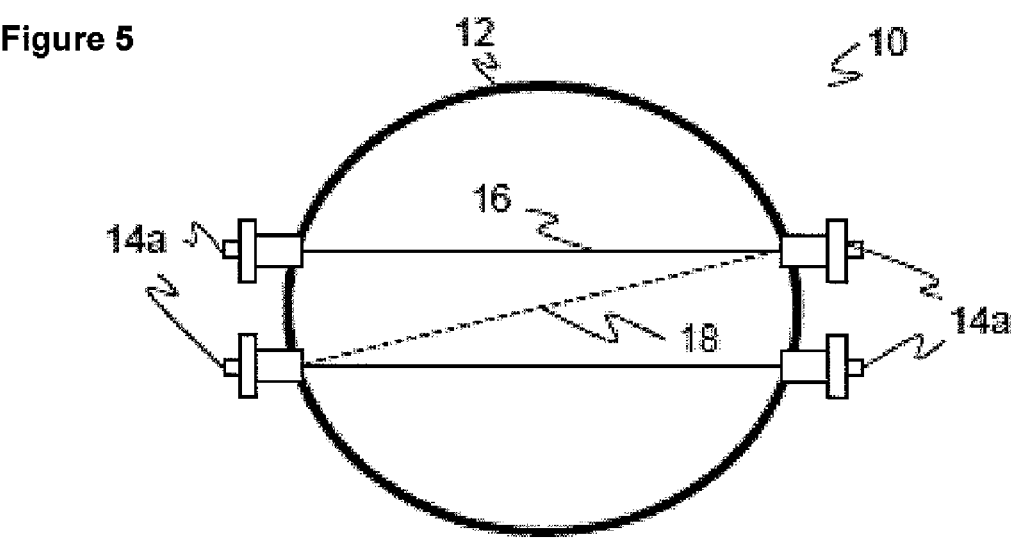
Figure 6:
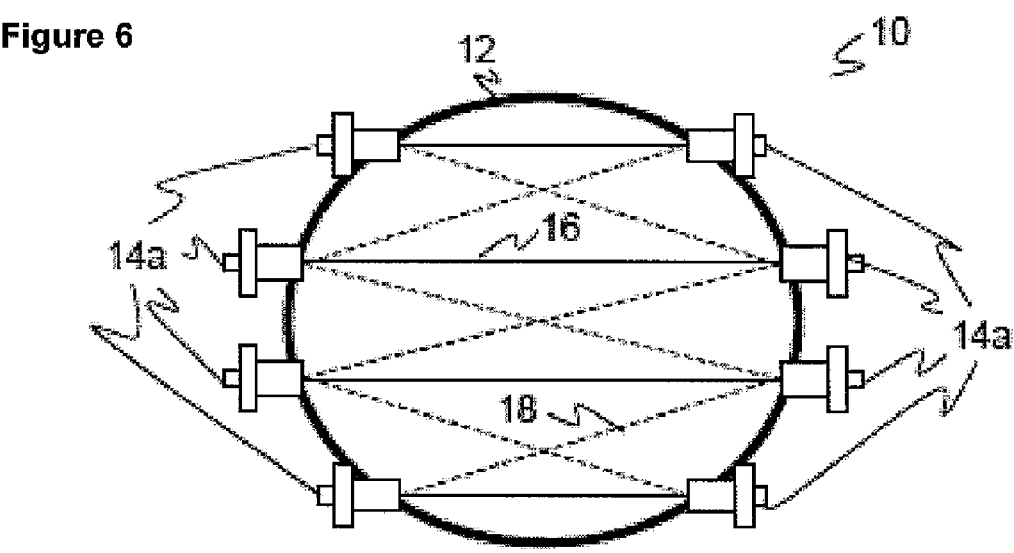
Figure 7:
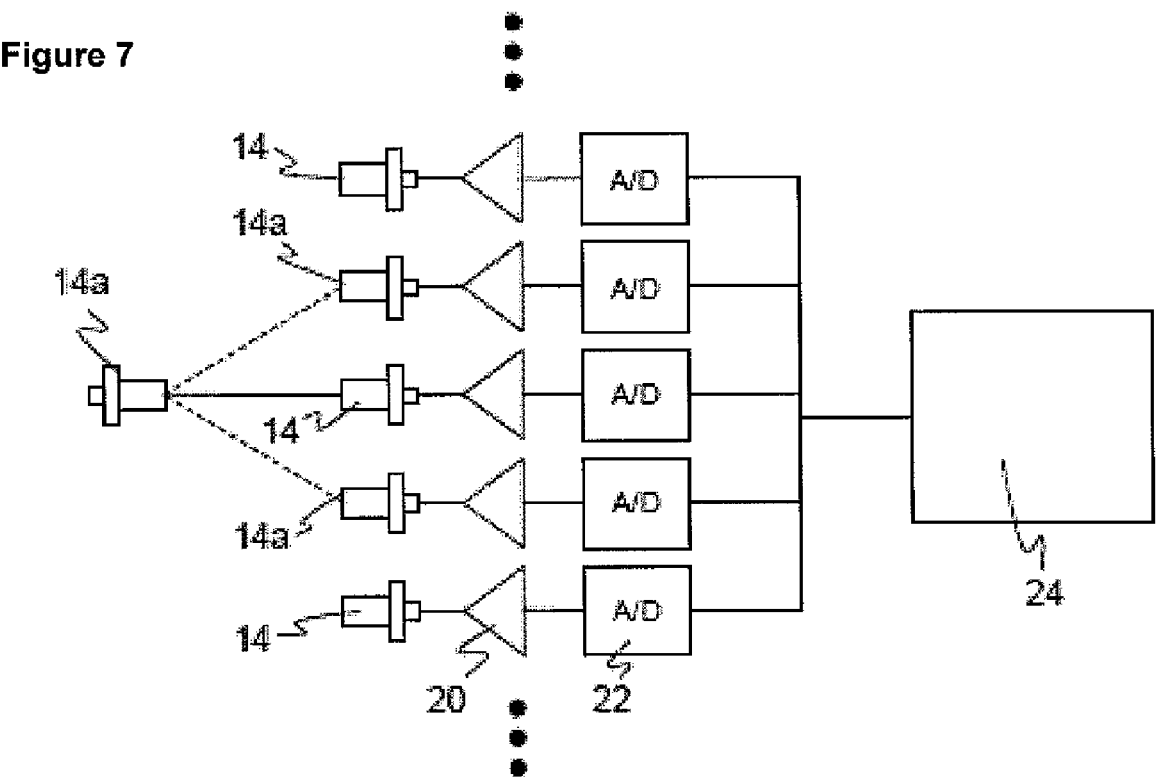

FIG. 2 a longitudinal section through the conduit and the ultrasonic transducer arrangement in accordance with FIG. 1;

FIG. 3 an oblique section similar to FIG. 1 of a further embodiment of the ultrasound measurement apparatus in accordance with the invention with only one secondary measurement path;

FIG. 4 an oblique section similar to FIG. 1 of a further embodiment of the ultrasound measurement apparatus in accordance with the invention with four instead of eight ultrasonic transducers;

FIG. 5 an oblique section in accordance with FIG. 4 with only one secondary measurement path;

FIG. 6 an oblique section similar to FIG. 1 of as further embodiment of the ultrasound measurement apparatus in accordance with the invention with additional secondary measurement paths;

FIG. 7 a block diagram of the signal processing and of the evaluation unit of the ultrasound measurement apparatus; and FIG. 8 a longitudinal representation of an ultrasound measurement apparatus in accordance with the prior art for the explanation of the time transit difference method.

FIG. 1 shows in an oblique section an ultrasound measurement apparatus 10 in accordance with the invention which includes a plurality of ultrasonic transducers 14 attached to the periphery of a conduit 12, eight in the example shown. The ultrasound measurement apparatus 10 usually has a separate conduit section 12 which is flanged to a desired measurement location in an existing conduit, for example a natural gas pipeline. The flow direction of a fluid in the conduit 12 extends into the plane of the paper in FIG. 1. The one half of the ultrasonic transducers 14, for example the four ultrasonic transducers 14 shown at the left, is arranged offset upstream or downstream with respect to the other half.

FIG. 1 is an oblique section which compensates this offset for a two-dimensional representation so that the ultrasonic transducers 14 lie on an ellipse in the plane of the illustration. FIG. 2 shows the same ultrasound measurement apparatus 10 in a longitudinal section. In this respect, the ultrasound transducers 14 are shortened to indicate their oblique positions. The ultrasonic transducers 14 shown by solid lines on the left are arranged in the pipe wall facing the observer; the other ultrasonic transducers 14 shown by dashed lines are arranged in the pipe wall remote from the observer.

The sound axes of two respective ultrasonic transducers 14 are mutually aligned and span a primary measurement path 16 between them which is shown by solid lines. The middle four ultrasonic transducers 14a have a wider sound cone so that not only the respective ultrasonic transducer 14a arranged directly opposite, but also its direct neighbor, or even possibly a neighbor yet further away, receives ultrasound. Secondary measurement paths 18 are thereby spanned which are shown by dashed lines. Those ultrasonic transducers 14 which are not involved in secondary measurement paths 18 have, in contrast, a sound cone which is as narrow as possible to utilize the ultrasound energy as efficiently as possible. It is, however, also conceivable that these ultrasonic transducers 14 have the same wider opening angles of their sound cones. The secondary measurement paths arising in this process then remain unused in this embodiment.

An evaluation unit explained in more detail further below in connection with FIG. 7 determines the transit time on a measurement with and against the flow for each primary measurement path 16 or secondary measurement path 18. In this respect, the measurement principle is that which was described in the introduction in connection with FIG. 8. Each ultrasonic transducer 14 operates alternately as a transmitter and as a receiver so that the transit time of an ultrasonic pulse is determined with and against the flow in every measurement path 16, 18. The evaluation unit determines a respective estimate of the flow speed for each measurement path from these transit times or from the transit time difference.

The evaluation unit subsequently forms two groups from these estimates. The one group is calculated as the actual main measured value. For this purpose, an average is calculated, with the influence of the individual estimates, however, being able to be weighted with reference to the geometry of the underlying measurement path 16, 18 and their importance for the total flow profile. The other group is calculated in accordance with the same basic principle as an independently determined second measured value which is used as the measured diagnosis value.

The main measured value and the measured diagnosis value are subsequently compared. If the deviation is larger than the desired measurement precision allows, this is a sign for a malfunction or a contamination of the pipe 12 or of an ultrasonic transducer 14. The evaluation unit then outputs a warning or a service request, for example.

The association of the two groups of estimates is generally free. As a rule, however, more measurement paths 16, 18 are assigned to the determination of the main measured value and only one or two measurement paths 16, 18 are used as diagnosis measurement paths, for example. In a preferred embodiment, these are in particular the secondary measurement paths 18. If as in FIG. 1, the ultrasonic transducers 14a disposed closest to the pipe axis span the secondary measurement paths 18, a diametrically extending diagnosis path results which reacts particularly sensitively to changes of the flow profile.

A plurality of geometrical arrangements of the ultrasonic transducers 14 are available for the path layout of which some are shown by way of example in FIGS. 3 to 6. The embodiment in accordance with FIG. 3 differs from that in accordance with FIG. 1 in that only one secondary measurement path 18 is provided. In the embodiments in accordance with FIG. 4 and FIG. 5, the total number of ultrasonic transducers 14 is reduced to four, with two secondary measurement paths 18 being provided in FIG. 4 and only one secondary measurement path 18 being provided in FIG. 5. In the embodiment in accordance with FIG. 6, eight ultrasonic transducers 18 are again used, with here all possible secondary measurement paths 18 being realized between direct neighbors to improve the spatial covering of the flow profile. All of these are only examples for path layouts which can also be combined with one another as mixed forms and to which the invention is not restricted. It is, for example, not absolutely necessary that the primary measurement paths 16 extend parallel to one another.

FIG. 7 explains the evaluation of the primary measurement paths 16 and of the secondary measurement paths 18. An ultrasonic transducer 14a transmits an ultrasonic pulse which, on the one hand, is received on a primary measurement path 16 by the directly associated ultrasonic transducer 14 and, on the other hand, due to the widened sound cone is also received on secondary measurement paths 18 by the ultrasonic transducers 14a which are directly adjacent the directly associated ultrasonic transducer 14. Further ultrasonic transducers 14 are provided which are, however, not involved in the part of the evaluation cycle shown because they do not receive any ultrasound from the then currently transmitting ultrasonic transducer 14a.

Each ultrasonic transducer 14, 14a is connected via an amplifier 20 and an analog-digital converter 22 to an evaluation unit 24 which is implemented on a microprocessor as a DSP (digital signal processor), as an FPGA (field programmable gate array), in an ASIC (application specific integrated circuit) or on a similar digital logic component. A time multiplexer is, for example, also conceivable instead of multichannel evaluation electronics.

The evaluation unit 24 thus receives the received signal of all ultrasonic transducers 14 in reaction to the transmitted ultrasonic pulse. A signal transit time is calculated from this with knowledge of the transmission time. In an evaluation cycle, one ultrasonic transducer 14 or, if signal overlaps are excluded by the geometry, also a plurality of ultrasonic transducers in parallel, respectively transmit an ultrasonic pulse after one another. Once each ultrasonic transducer 14 has adopted the role as transmitter once, the transit times with and against the flow are available on all measurement paths 16, 18 so that the evaluation unit 24 can determine the difference transit times after the correct association. The individual measured values thus obtained on each measurement path 16, 18 are then calculated as the main measured value and the measured diagnosis value in the above-described manner and these are in turn compared with one another.

The invention claimed is:

1. An ultrasound measurement apparatus (10) for measuring the flow speed of a fluid in a conduit (12) having a plurality of ultrasonic transducers (14) pairs of which span between them a plurality of main measurement paths and at least one diagnosis measurement path, and having an evaluation unit (24) which is made to calculate a respective individual measured value for the flow speed from transit times of ultrasound transmitted and received with and against the flow on each measurement path (16, 18), to calculate individual measured values of the main measurement paths as a main measured value for the flow speed, to determine a measured diagnosis value from the at least one individual measured value of the diagnosis measured path and to compare the main measured value and the measured diagnosis value with one another, characterized in that
at least some of the ultrasonic transducers (14a) have widened transmission and reception lobes so that a plurality of ultrasonic transducers (14, 14a) are arranged in their transmission and reception lobes so that, in addition to the primary measurement paths (16) spanned between two mutually aligned ultrasonic transducers, at least one additional secondary measurement path (18) is opened as a main measurement path or as a diagnosis measurement path.

2. An ultrasound measurement apparatus (10) in accordance with claim 1, wherein at least one diagnosis measurement path is a secondary measurement path (18); and/or wherein the at least one diagnosis measurement path is arranged diametrically.

3. An ultrasound measurement apparatus (10) in accordance with claim 1, wherein the main measurement paths correspond to the primary measurement paths (16) and/or the at least one diagnosis measurement path corresponds to the at least one secondary measurement path (18).

4. An ultrasound measurement apparatus (10) in accordance with claim 1, wherein the primary measurement paths (16) are aligned parallel to one another.

5. An ultrasound measurement apparatus (10) in accordance with claim 1, wherein two or four primary measurement paths (16) are provided; and/or wherein one or two secondary measurement paths (18) are provided.

6. An ultrasound measurement apparatus (10) in accordance with claim 1, wherein those ultrasound transducers (14a) whose associated primary measurement paths (16) have the smallest spacing from the axis of the conduit (12) have widened transmission and reception lobes.

7. An ultrasound measurement apparatus (10) in accordance with claim 1, wherein the ultrasonic transducers (14) are attached in a symmetrical arrangement.

8. An ultrasound measurement apparatus (10) in accordance with claim 1, wherein the evaluation unit (24) is made to change the association of the main measurement paths and of the at least one diagnosis measurement path to primary measurement paths (16) and secondary measurement paths (18).

9. An ultrasound measurement apparatus (10) in accordance with claim 1, wherein the evaluation unit (24) is made to simultaneously pick up a received signal at all ultrasonic transducers (14, 14a) associated with the ultrasonic transducer (14a) by a primary measurement path (16) or a secondary measurement path (18) and to calculate a corresponding plurality of signal transit times on the transmission of a signal from an ultrasonic transducer (14a) which is involved in a secondary measurement path.

10. An ultrasound measurement apparatus (10) in accordance with claim 1, wherein the evacuation unit (24) is made, in a measurement cycle, a) to transmit a respective signal from each ultrasonic transducer (14) after one another, b) to calculate a signal transit time on all measurement paths of the respective ultrasonic transducer (14), c) to associate all the signal transit times of the measurement cycle, once they have been determined, with one another pairwise in each case with reference to the measurement paths (16, 18) and d) to determine the individual measurement values from them.

11. An ultrasound measurement apparatus (10) in accordance claim 1, wherein the fluid is natural gas and/or the conduit (12) is a pipeline.

12. A method for measuring the flow speed of a fluid in a conduit (12) by means of ultrasound, wherein a plurality of ultrasonic transducers (14) span a plurality of main measurement paths and at least one diagnosis measurement path; and wherein, on each measurement path (16, 18), a respective individual measured value for the flow speed is determined from transit times of ultrasound transmitted and received with and against the flow, individual measured values of the main measurement paths are calculated as a main measured value for the flow speed, a measured diagnosis value is determined from the at least one individual measured value of the diagnosis measurement path and the main measured value is compared with the measured diagnosis value, characterized in that
at least some of the ultrasonic transducers (14a) form measurement paths (16, 18) by widened transmission and reception lobes to a plurality of ultrasonic transducers (14, 14a) so that at least one additional secondary measurement path (18) is used as a main measurement path or as a diagnosis measurement path apart from the primary measurement paths (16) spanned between two respective mutually aligned ultrasonic converters (14, 14a).

13. A method in accordance with claim 12, wherein the association of the main measurement paths and of the at least one diagnosis measurement path (16) with primary measurement paths (16) and secondary measurement paths (18) is changed.

14. A method in accordance with claim 12, wherein, on the transmission of a signal from an ultrasonic transducer (14a) which is involved in a secondary measurement path (18), a received signal is simultaneously picked up at all ultrasonic transducers (14, 14a) associated with the ultrasonic transducer (14a) by a primary measurement path (16) or a secondary measurement path (18) and a corresponding plurality of signal transit times is calculated.

15. A method in accordance with claim 13, wherein, in a measurement cycle, a) a respective signal is transmitted from each ultrasonic transducer (14) after one another, b) a signal transit time is calculated on all measurement paths of the respective ultrasonic transducer (14, 14a), c) all the signal transit times of the measurement cycle are associated, once they have been determined, with one another pairwise in each case with reference to the measurement paths (16, 18) and d) the individual measured values are determined from them.

* * * * *